(12) United States Patent
McGrath

(10) Patent No.: US 7,685,218 B2
(45) Date of Patent: Mar. 23, 2010

(54) HIGH FREQUENCY SIGNAL CONSTRUCTION METHOD AND APPARATUS

(75) Inventor: David S. McGrath, Rose Bay (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 601 days.

(21) Appl. No.: 11/612,895

(22) Filed: Dec. 19, 2006

(65) Prior Publication Data

US 2007/0098185 A1 May 3, 2007

Related U.S. Application Data

(63) Continuation of application No. 10/473,800, filed as application No. PCT/AU02/00464 on Apr. 10, 2002, now abandoned.

(30) Foreign Application Priority Data

Apr. 10, 2001 (AU) .................................. PR4339

(51) Int. Cl.
*G06F 17/10* (2006.01)
(52) U.S. Cl. ..................................... 708/313
(58) Field of Classification Search ................ None
See application file for complete search history.

(56) References Cited

U.S. PATENT DOCUMENTS

| | | | |
|---|---|---|---|
| 3,684,838 A | 8/1972 | Kahn | 179/15.55 R |
| 3,995,115 A | 11/1976 | Kelly | 179/1.5 S |
| 4,610,022 A | 9/1986 | Kitayama et al. | 381/36 |
| 4,667,340 A | 5/1987 | Arjmand et al. | 381/31 |
| 4,757,517 A | 7/1988 | Yatsuzuka | 375/25 |
| 4,776,014 A | 10/1988 | Zinser, Jr. | 381/38 |
| 4,790,016 A | 12/1988 | Mazor et al. | 381/36 |
| 4,885,790 A | 12/1989 | McAulay et al. | 381/36 |
| 4,914,701 A | 4/1990 | Zibman | 381/36 |
| 4,935,963 A | 6/1990 | Jain | 704/207 |
| 5,001,758 A | 3/1991 | Galand et al. | 381/36 |
| 5,054,072 A | 10/1991 | McAulay et al. | 381/31 |
| 5,054,075 A | 10/1991 | Hong et al. | 381/36 |

(Continued)

FOREIGN PATENT DOCUMENTS

DE 195 09 149 9/1996

(Continued)

OTHER PUBLICATIONS

Cheung et al, "High Quality 16 KB/S Voice Transmission: The Subband Coder Approach," IEEE Conf on Acoust., Speech, Signal Proc., pp. 319-322, 1980.

(Continued)

*Primary Examiner*—David H Malzahn
(74) *Attorney, Agent, or Firm*—Dov Rosenfeld; Inventek

(57) ABSTRACT

A method of adding high frequency content to an input signal to form an augmented signal, the method comprising the steps of: (a) providing an initial signal having a first predetermined lower spectral range; (b) utilizing the initial signal to form synthesized high frequency components of the initial signal; (c) filtering the initial signal with a low pass filter and filtering the synthesized high frequency components with a high pass filter (d) combining the filtered signals to form the augmented signal.

16 Claims, 6 Drawing Sheets

U.S. PATENT DOCUMENTS

| | | | | |
|---|---|---|---|---|
| 5,075,880 | A | 12/1991 | Moses et al. | 364/724.1 |
| 5,109,417 | A | 4/1992 | Fielder et al. | 704/205 |
| 5,115,471 | A | 5/1992 | Liden | 381/106 |
| 5,127,054 | A | 6/1992 | Hong et al. | 381/36 |
| 5,226,000 | A | 7/1993 | Moses et al. | 364/724.1 |
| 5,264,846 | A | 11/1993 | Oikawa | 704/229 |
| 5,381,143 | A | 1/1995 | Shimoyoshi et al. | 341/51 |
| 5,394,473 | A | 2/1995 | Davidson | 704/200.1 |
| 5,402,124 | A | 3/1995 | Todd et al. | 341/131 |
| 5,461,378 | A | 10/1995 | Shimoyoshi et al. | 341/51 |
| 5,583,962 | A | 12/1996 | Davis et al. | 704/229 |
| 5,587,998 | A | 12/1996 | Velardo et al. | 370/289 |
| 5,623,577 | A | 4/1997 | Fielder | 704/200.1 |
| 5,636,324 | A | 6/1997 | Teh et al. | 704/226 |
| 5,692,102 | A | 11/1997 | Pan | 704/230 |
| 5,758,020 | A | 5/1998 | Tsutsui | 704/204 |
| 5,758,315 | A | 5/1998 | Mori | 704/229 |
| 5,842,160 | A | 11/1998 | Zinser | 704/229 |
| 5,892,850 | A | 4/1999 | Tsuruoka | 382/240 |
| 5,903,482 | A | 5/1999 | Iwamura et al. | 364/724.1 |
| 5,924,064 | A | 7/1999 | Helf | 704/229 |
| RE36,478 | E | 12/1999 | McAulay et al. | 704/206 |
| 6,014,621 | A | 1/2000 | Chen | 704/220 |
| 6,058,362 | A | 5/2000 | Malvar | 704/230 |
| 6,092,041 | A | 7/2000 | Pan et al. | 704/229 |
| 6,115,689 | A | 9/2000 | Malvar | 704/503 |
| 6,138,051 | A | 10/2000 | Dieterich | 700/94 |
| 6,222,941 | B1 | 4/2001 | Zandi et al. | 382/232 |
| 6,300,888 | B1 | 10/2001 | Chen et al. | 341/63 |
| 6,336,092 | B1 | 1/2002 | Gibson et al. | 704/268 |
| 6,341,165 | B1 | 1/2002 | Gbur et al. | 381/23 |
| 6,351,730 | B2 | 2/2002 | Chen | 704/229 |
| 6,424,939 | B1 | 7/2002 | Herre et al. | 704/219 |
| 6,553,396 | B1 | 4/2003 | Fukuhara et al. | 708/313 |
| 6,675,144 | B1 | 1/2004 | Tucker et al. | 704/264 |
| 6,708,145 | B1 | 3/2004 | Liljeryd et al. | 704/200.1 |
| 2002/0009142 | A1 | 1/2002 | Aono et al. | 375/240.11 |
| 2003/0093282 | A1 | 5/2003 | Goodwin | 704/500 |
| 2003/0187663 | A1 | 10/2003 | Truman et al. | 704/500 |
| 2004/0114687 | A1 | 6/2004 | Ferris et al. | 375/240.11 |
| 2004/0131203 | A1 | 7/2004 | Liljeryd et al. | 381/98 |

FOREIGN PATENT DOCUMENTS

| | | |
|---|---|---|
| EP | 0 632 574 | 1/1995 |
| EP | 0632574 | 1/1995 |
| EP | 0 746 116 A2 | 12/1996 |
| WO | WO 98/57436 | 12/1998 |
| WO | WO 00/45379 | 8/2000 |
| WO | WO 01/91111 | 11/2001 |
| WO | WO 02/41302 | 5/2002 |

OTHER PUBLICATIONS

Office Action to U.S. Appl. No. 10/113,858 mailed Oct. 18, 2007.
Office Action to U.S. Appl. No. 10/174,493 mailed Oct. 1, 2007.
Office Action to U.S. Appl. No. 10/238,047 mailed Feb. 9, 2006.
Office Action to U.S. Appl. No. 10/238,047 mailed Sep. 6, 2006.
"Guide to Wadia Technology." 2001. Wadia, Ann Arbor, MI. URL: http://www.wadia.com/technology/tech_guide.htm.
"204 Aural Exciter and Optical Big Bottom: Instruction Manual," Aphex Systems Ltd., Sun Valley, CA, revision 2, released Sep. 1, 2001. Downloaded Dec. 22, 2006 at: http://www.aphex.com/pdf/204/Aphex_204_user_man.pdf.
Atkinson, I. A.; et al., "Time Envelope LP Vocoder: A New Coding Technique at Very Low Bit Rates,"$4^{th}$ European Conference on Speech Communication and Technology, ESCA Eurospeech '95 Madrid, Sep. 1995, ISSN 1018-4074, pp. 241-244.
ATSC Standard: Digital Audio Compression (AC-3), Revision A, Aug. 20, 2001, Sections 1-4, 6, 7.3 and 8.
Bosi, et al., "ISO/IEC MPEG-2 Advanced Audio Coding," J. Audio Eng. Soc., vol. 45, No. 10, Oct. 1997, pp. 789-814.
Edler, "Codierung von Audiosignalen mit uberlappender Transformation und Adaptivene Fensterfunktionen," Frequenz, 1989, vol. 43, pp. 252-256.
Galand, et al.; "High-Frequency Regeneration of Base-Band Vocoders by Multi-pulse Excitation" IEEE Int. Conf. Sys. (ICASSP 87), Apr. 1987, pp. 1934-1937.
Grauel, Christoph, "Sub-Band Coding with Adaptive Bit Allocation," Signal Processing, vol. 2 No. 1, Jan. 1980, No. Holland Publishing Co., ISSN 0 165-1684, pp. 23-30.
Herre, et al., "Enhancing the Performance of Perceptual Audio Coders by Using Temporal Noise Shaping (TNS)," 101st AES Convention, Nov. 1996, preprint 4384.
Herre, et al., "Exploiting Both Time and Frequency Structure in a System That Uses an Analysis/Synthesis Filterbank with High Frequency Resolution," 103rd AES Convention, Sep. 1997, preprint 4519.
Herre, et al., "Extending the MPEG-4 AAC Codec by Perceptual Noise Substitution," 104th AES Convention, May 1998, preprint 4720.
Laroche, et al., "New phase-Vocoder Techniques for Pitch-Shifting, Harmonizing and Other Exotic Effects" Proc. IEEE Workshop on Applications of Signal Processing to Audio and Acoustics, New Paltz, new York, Oct. 17-20, 1999, p. 91-94.
Makhoul, et al.; "High-Frequency Regeneration in Speech Coding Systems" IEEE Int. Conf. Sys. (ICASSP 79), Mar. 1979, pp. 428-431.
Rabiner, et al., "Digital Processing of Speech Signals,": Prentice-Hall, 1978, pp. 396-404.
Stott, Jonathan, "DRM-key technical features" EBU Technical Review, Mar. 2001, pp. 1-24.
Sugiyama, et. al., "Adaptive Transform Coding With an Adaptive Block Size (ATC-ABS)", IEEE Intl. Conf. on Acoust., Speech, and Sig. Proc., Apr. 1990.
Zinser, R. L., "An Efficient, Pitch-Aligned High-Frequency Regeneration Technique for RELP Vocoder" IEEE 1985, p. 969-972.
Liu, Chi-Min, et al.; "Design of the Coupling Schemes for the Dolby AC-3 Coder in Stereo Coding", Int. Conf. on Consumer Electronics, ICCE, Jun. 2, 1998, IEEE XP010283089; pp. 328-329.
Hans, M., et al., "An MPEG Audio Layered Transcoder" preprints of papers presented at the AES Convention, XX, XX, Sep. 1998, pp. 1-18.
Nakajima, Y., et al. "MPEG Audio Bit Rate Scaling On Coded Data Domain" Acoustics, Speech and Signal Processing, 1998, Proceedings of the 1998 IEEE Int'l. Conf. on Seattle, WA, May 12-15, 1998, New York IEEE pp. 3669-3672.
Ehret, A., et al., "Technical Description of Coding Technologies' Proposal for MPEG-4 v3 General Audio Bandwidth Extension: Spectral Band Replication (SBR)", Coding Technologies AB/GmbH.
PCT International Preliminary Examination Report on PCT Application PCT/AU02/00464, Nov. 7, 2002.
PCT International Search Report on PCT Application PCT/AU02/00464, May 30, 2002.

HIGH FREQUENCY SIGNAL CONSTRUCTION METHOD AND APPARATUS

RELATED APPLICATIONS

The present invention is a continuation of U.S. application Ser. No. 10/473,800 filed Sep. 30, 2003 to first inventor McGrath and titled "HIGH FREQUENCY SIGNAL CONSTRUCTION METHOD AND APPARATUS." U.S. application Ser. No. 10/473,800 is a national filing under 35 USC 371 of PCT Application PCT/AU02/00464 titled "HIGH FREQUENCY SIGNAL CONSTRUCTION METHOD AND APPARATUS" filed Apr. 10, 2002 claiming priority of Australian Patent Application PR04339 titled "HIGH FREQUENCY SIGNAL CONSTRUCTION METHOD AND APPARATUS" filed Apr. 10, 2001.

The contents of U.S. application Ser. No. 10/473,800 are incorporated herein by reference.

BACKGROUND

1. Field of the invention

The present invention relates to the synthesis of high frequency signals and, in particular, discloses a method and system for synthesizing high frequency audio signals.

2. Background of the Invention

The digital recording of audio signals has become extremely popular. The most popular format for recording is the CD audio format which samples a signal at approximately 44.1 KHz. This is likely to produce a corresponding audio range of approximately 20 kHz which was thought to be adequate for reproducing the audio range that the human ear can detect. However, it is thought by some that the human ear is able to colour an audio signal through the utilization of portions of a signal above 20 kHz. Hence, recent standards have proposed either an 88.2 or a 96 kHz sampling rate. There is therefore the significant problem of how one takes, for example, a 44.1 kHz recorded signal and remasters the signal in say an 88.2 kHz format. One standard technique utilized is to use an interpolator that also uses some kind of linear filter to perform an anti alias filtering operation.

For the purposes of further discussion, the following terminology is defined:

The original signal is called the Original Audio Signal.

The original audio sample rate is called the Original Sample Rate.

The original audio signal is believed to be "accurate" up to a frequency known as the Original Frequency Range.

The Original Half Nyquist Frequency is defined as 0.5 times the Original Sample Rate.

The interpolated signal is called the Interpolated Audio Signal.

The new (higher) audio sample rate is called the Interpolated Sample Rate.

The Interpolated Half Nyquist Frequency is defined as 0.5 times the Interpolated Sample Rate.

The Oversampling Ratio is the Interpolated Sample Rate divided by the Original Sample Rate.

Typical values of the above defined quantities are

For a CD player with 4× oversampling D/A converters:

Original Sample Rate=44,100 Hz

Original Frequency Range=20,000 Hz

Original Half Nyquist Frequency=22,050 Hz

Interpolated Sample Rate=176, 400 Hz

Interpolated Half Nyquist Frequency=88, 200 Hz

In a system like this, the Original Audio Signal only contains reliable content up to 20 kHz, but it is assumed it may be desirable to synthesize new high frequency content up to say 88.2 kHz.

For a DVD player with 2× oversampling D/A converters:

Original Sample Rate=48,000 Hz 'Original Frequency Range=20,000 Hz Original Half Nyquist Frequency=24,000 Hz Interpolated Sample Rate=96,000 Hz Interpolated Half Nyquist Frequency=48,000 Hz In a system like this, the Original Audio Signal only contains reliable content up to 20 kHz, but it may be desirable to synthesize new high frequency content up to 48 kHz.

The standard prior art anti-aliasing approach to higher sampling rate extension operates on the principle that as no information about what audio content may have existed above the Original Half Nyquist Frequency is provided in the original audio material, it is necessary to ensure that an Interpolated Audio Signal has zero content in this upper frequency range.

The standard prior art method for producing an interpolated signal will now be described. Turning initially to FIG. 1, an original audio signal 1 is provided having samples e. g., 11,12. The samples are assumed to have been provided at a standard rate. The first step in forming the interpolated signal is to zero pad the audio signal as illustrated in FIG. 2. In zero padding, zero value signals e. g., 14,15 are added to the signal between samples. Next, as illustrated in FIG. 3, an interpolation process is provided where the signal e. g., 18 is formed from an interpolation of the two signals 17,19. In the example provided, the interpolated sample rate is twice the original sample rate and hence the over sampling ratio is 2 with one zero sample inserted between each sample of the original audio signal. The zero-padding technique results in aliasing, meaning that the low frequency audio signal is duplicated in higher frequency bands. These higher frequency replicas (called aliases) are then filtered out (using a low-pass filter), to leave the Interpolated Audio Signal.

An example of aliasing is illustrated in FIG. 4 where an original audio signal having a frequency spectrum 21 is zero padded resulting in the zero padded audio signal having a frequency spectrum 23,24 with the lower frequency being replicated in high frequency bands. The interpolation process is equivalent to applying a low-pass filter 27 which results in the interpolated audio signal 29 which substantially reflects the original audio signal 21.

The arrangement of the prior art has a significant disadvantage in that none of the high frequency spectrum is utilized when a re-sampling occurs.

SUMMARY

It is an object of the present invention is to provide for alternative forms of high frequency signal extension of signals.

According to a first aspect of the invention there is provided method of adding high frequency content to an input signal to form an augmented signal, the method comprising the steps of:

(a) providing an initial signal having a first predetermined lower spectral range;

(b) utilizing said initial signal to form synthesized high frequency components of said initial signal which extend beyond said lower spectral range;

(c) filtering said initial signal with a low pass filter and filtering said synthesized high frequency components with a high pass filter (d) combining said high and low pass filtered signals to form said augmented signal.

Preferably, step (b) further comprises:
(i) for at least one portion of the input signal, determining the spectral content of said portion;
(ii) extrapolating a high frequency end portion of the spectral content to form said synthesized higher frequency components of said signal.

Conveniently, said portion is multiplied with a window function prior to determination of the spectral content and said synthesized higher frequency components are summed in an overlap-add fashion.

Advantageously, the method includes the step of dividing the input signal into a plurality of overlapping blocks, with each block being multiplied by a sliding window function to yield a series of windowed portions from which high frequency components are successively synthesized.

The window may be of a Gaussian or Hanning form.

The invention extends to a method of adding high frequency content to an input signal to form an augmented signal, the method comprising the steps of:
(a) providing an initial signal having a first predetermined lower spectral range;
(b) utilizing said initial signal to form synthesized high frequency components of said initial signal which extend beyond said lower spectral range, wherein step (b) further comprises:
(i) for at least one portion of the input signal, determining the spectral range of said portion;
(ii) extrapolating a high frequency end portion of the spectral range to form said synthesized higher frequency components of said signal.

Conveniently, said portion is multiplied with a window function prior to determination of the spectral content, and said synthesized high frequency components are summed in an overlap-add fashion.

Preferably, the method includes the steps of dividing the input signal into a plurality of overlapping blocks, with each block being multiplied by a sliding window function to yield a series of windowed portions from which high frequency components are successively synthesized.

Conveniently, at least some of the highest frequency components of said spectral content are discarded prior to the extrapolation of the remaining high frequency components.

Typically, the step of extrapolating said high frequency end portion comprises the steps of sampling the high frequency components, defining an extrapolation factor based on a geometric progression, and generating said geometric progression on the basis of the sampled high frequency components.

According to still further aspect of the invention there is provided apparatus for adding high frequency content to an input signal to form an augmented signal, the apparatus comprising:
(a) a synthesizing processor for synthesizing high frequency components from an initial signal having a first predetermined lower spectral range, said high frequency components extending beyond said lower spectral range;
(b) a low pass filter for filtering said initial signal;
(c) a high pass filter for filtering said synthesized high frequency components;
(d) a combiner for combining said high and low pass filtered signals to form said augmented signal.

Preferably, said synthesizing processor comprises means for determining the spectral content of at least one portion of said input signal and means for extrapolating from a high frequency end portion of said spectral content to form said synthesized high frequency components of said signal.

The invention still further provides an apparatus for adding high frequency content to an input signal to form an augmented signal, the apparatus comprising:
(a) a synthesizing processor for synthesizing high frequency components from an initial signal having a first predetermined lower spectral range, said high frequency components extending beyond said lower spectral range;
(b) means for dividing the input signal into a plurality of overlapping portions;
(c) means for determining the spectral content of each of said overlapping portions; (d) means for extrapolating the high frequency end portion of the spectral content to form said synthesized high frequency components of said signal; (e) means for summing said synthesized high frequency components in a overlap-add fashion.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

In the preferred embodiment, there are provided various techniques for creating a reasonable estimate of the frequency response of the audio signal above the original frequency range. Further, the techniques are extended to include techniques for incorporating the extended frequency response signal into the interpolated audio signal whilst ensuring that the interpolated audio signal is an accurate match to the original signal in the more important lower frequency range.

All frequency extension techniques are, by definition, non-linear, because they cause the creation of new frequency content in the output signal that was not present in the input signal. Hence it is extremely difficult to ensure that a Frequency Extension Technique does not also introduce non-linear/distortion artifacts that are audible within the Original Frequency Range of the Original Audio Signal. Hence, the preferred embodiment proposes that the information from the Original Audio Signal, within the Original Frequency Range, should be preserved, by reinserting it into the Interpolated Audio Signal.

Figure 1:
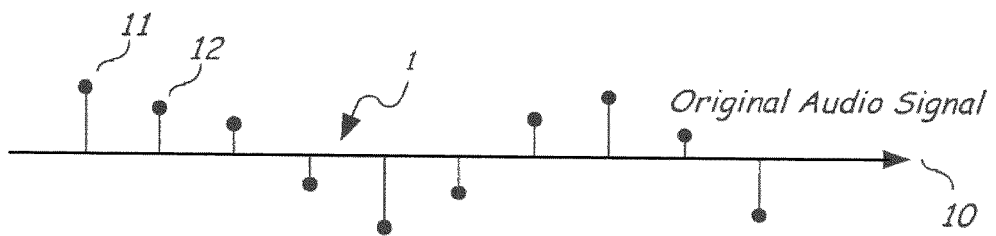
FIG. 1 illustrates a sampled original audio signal.
Figure 2:
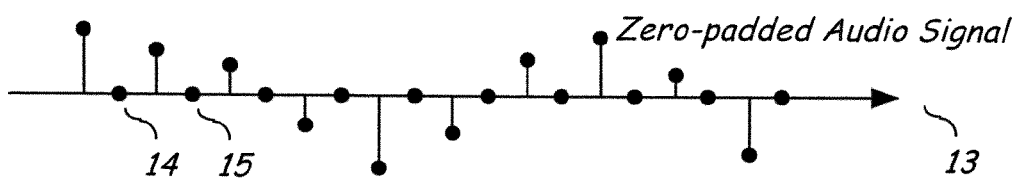
FIG. 2 illustrates a zero padded audio signal.
Figure 3:
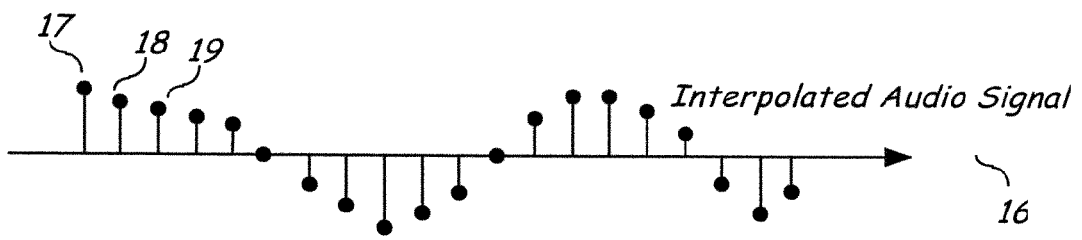
FIG. 3 illustrates an interpolated audio signal.
Figure 4:
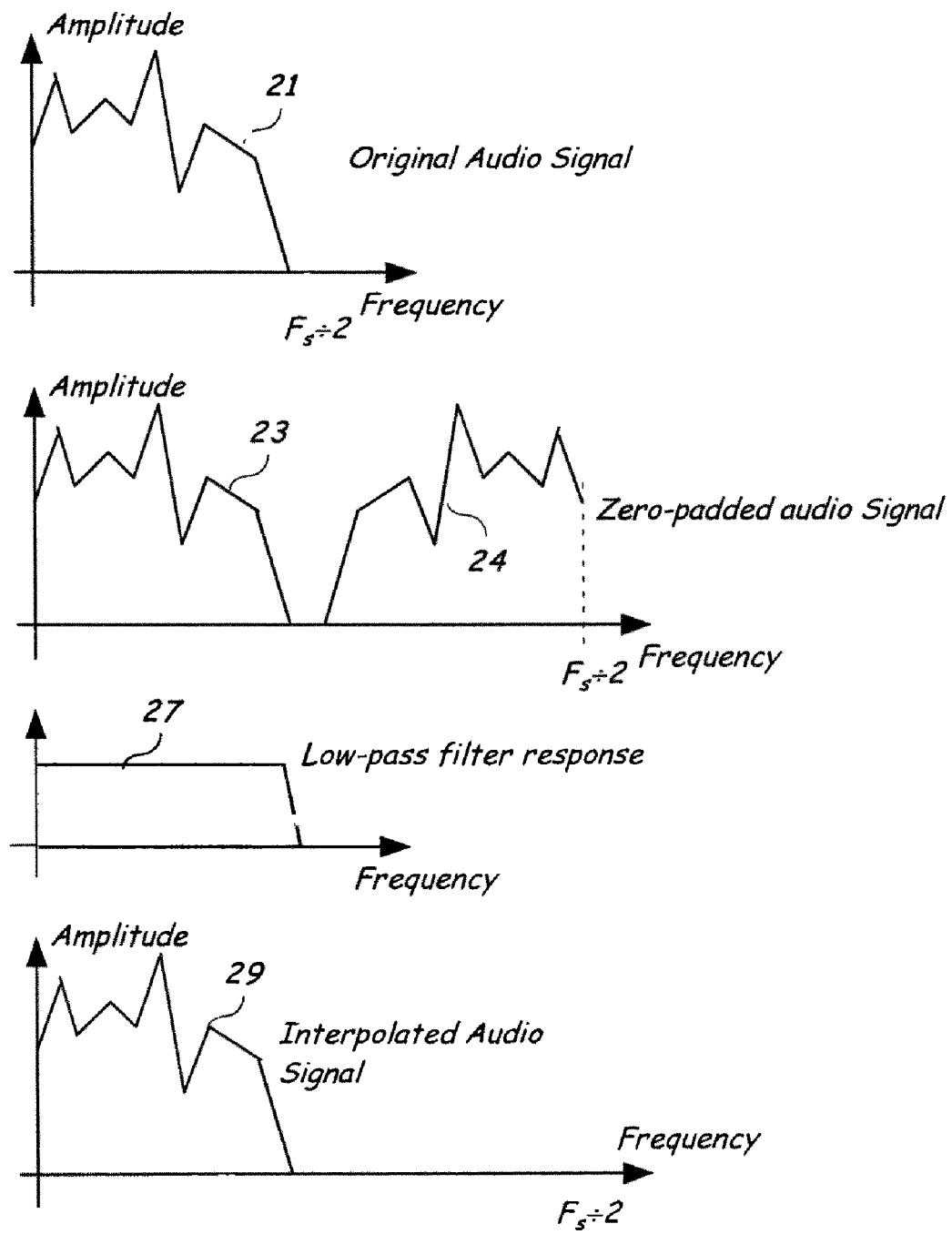
FIG. 4 illustrates the prior art process of forming an interpolated audio signal in the frequency domain.
Figure 5:
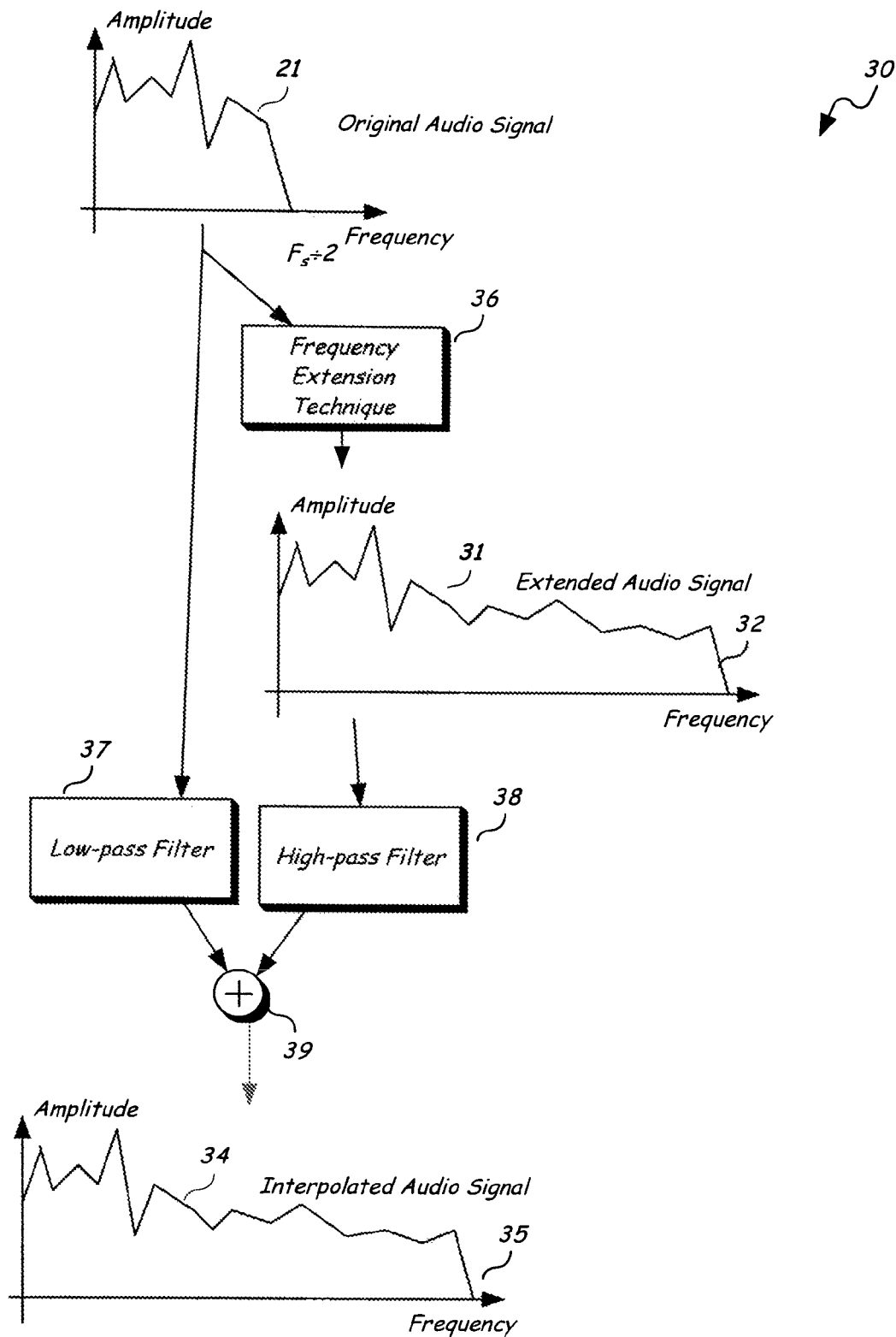
FIG. 5 illustrates the basic process of forming an augmented audio signal in accordance with one embodiment.

An example of this arrangement is shown at 30 in FIG. 5 where an original audio signal having a spectrum 21 is adapted utilizing a frequency extension technique 36 which is described in more detail below so as to provide for an extended audio signal having an extended frequency 32. The original signal is low-pass filtered using a low pass filter 37 and the extended audio signal is high-pass filtered using a high pass filter 38 before they are combined at 39 to produce the interpolated or augmented audio signal 34,35 which extends into the high frequency range. Hence, the Interpolated Audio Signal is composed of two signal components added together:

I. The low frequency part of the Original Audio Signal.
II. The high frequency part of the Extended Audio Signal.

In many cases, the Extended Audio Signal will be a very close approximation to the Interpolated Audio Signal, but the use of the low-pass 37 and high-pass 38 filters, and the summing element 39, ensure that any inaccuracies in the low frequency part of the Extended Audio Signal are removed, and replaced with the more accurate low-frequency components from the Original Audio Signal.

The use of the low-pass/high-pass technique, has the following benefits:

I. Low frequency information (from the Original Audio Signal) is preserved in an unaltered form;
II. High frequency information approximating the likely extension of the Original Audio Signal is added without affecting the low frequency information, but still using the Original Audio signal as a basis for the extension.

Figure 6:
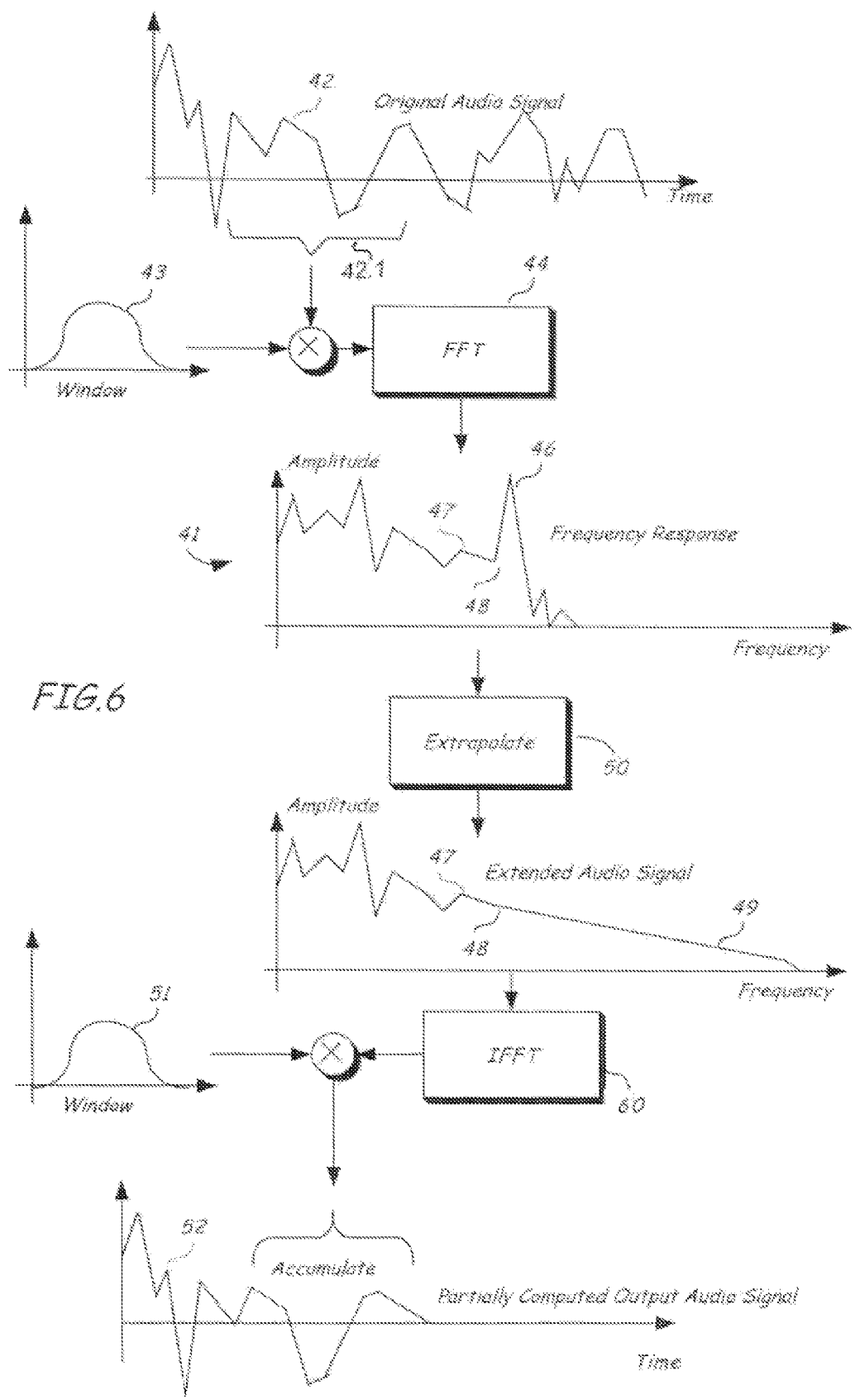
FIG. 6 illustrates the frequency extension process of FIG. 5.

One method for high frequency extension 36 can operate by working on a sliding window on the Original Audio Signal, so that, with each iteration of the process, a windowed segment of the Original Audio Signal is analyzed, say in the Fourier domain, resulting in the method as is shown in FIG. 6, which shows a single iteration.

A segment or block 42.1 of the original audio signal 42 is multiplied with a window 43 (which can be of Gaussian form). The multiplied result of the two signals is then transferred into the Fourier domain using a Fast Fourier Transform (FFT) 44 or the like so as to produce a frequency response 41. The frequency response curve 41 will often include a ringing peak 46 that appears due to the anti-alias filter. However, the lower frequency points 47 and 48 adjacent the peak but still at the high frequency end of the response can be relied upon as truer indicators of the high frequency content of the original audio signal. Hence an extrapolation process 50 can be carried out so as to extend the representative high frequency components 47 and 48 of the audio signal. The components at points 47 and 48 are extrapolated, thereby yielding a reasonable estimate of the extended audio signal 49. The extended audio signal 49 then undergoes an inverse fast Fourier transform 60 before being multiplied by a Gaussian window 51 to yield a partially computed output audio signal 52 in the time domain.

Obviously, various other extrapolation techniques can be utilized. For example, in a 32 tap FFT filter, the FFT bins ranging from 13.5,15,16.5,18 to 19.5 kHz can be used. The 19.5 kHz bin may be adversely influenced by the peak 46. One form of extension can be made by extrapolating the difference between the samples 47 and 48 corresponding, say, to the 16.5 and 18 kHz bins, to higher frequencies, and by continuing them in a geometric series, as outlined in the mathematical summary below.

Figure 7:
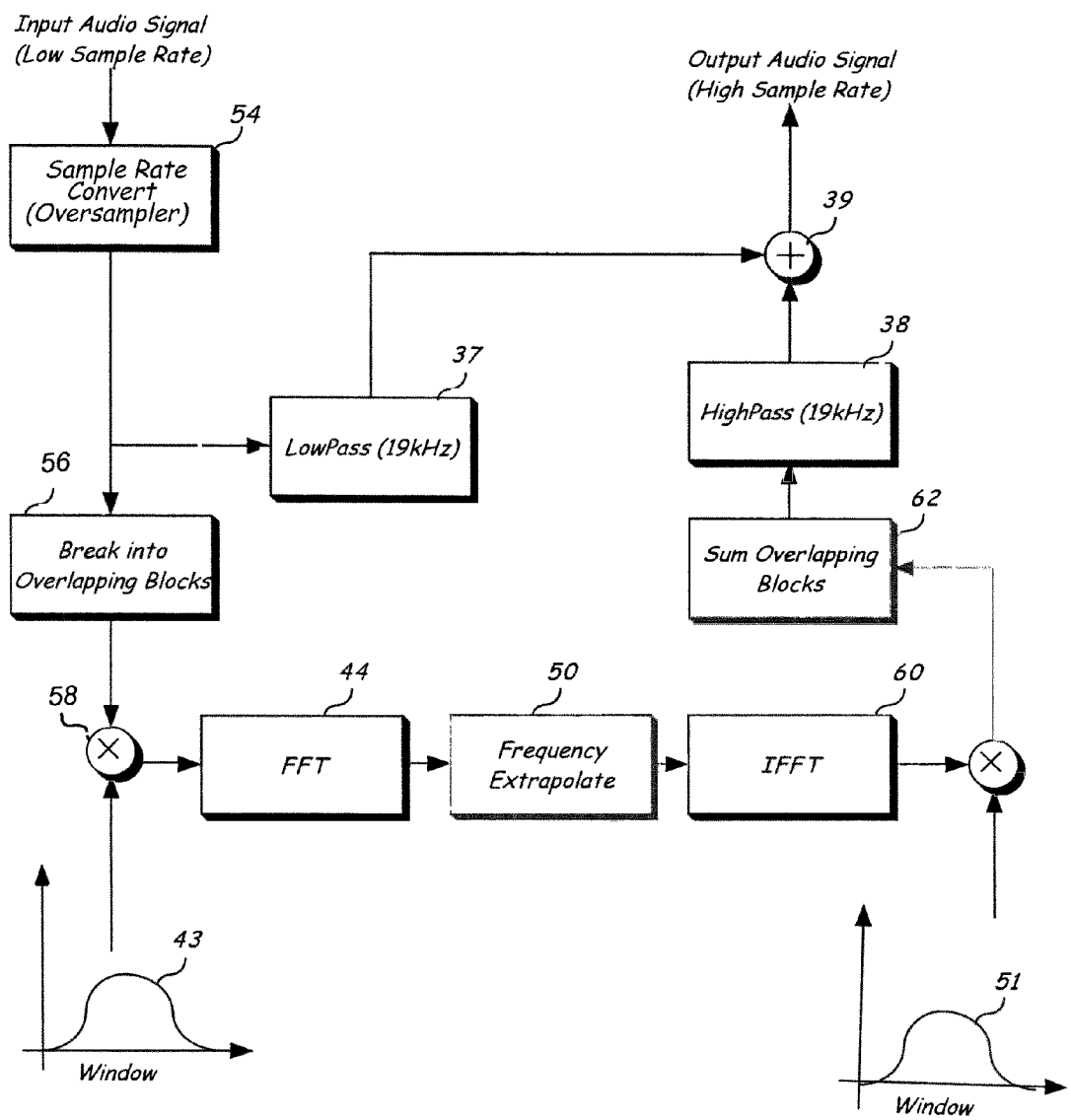
FIG. 7 illustrates a first embodiment of an apparatus for generating an augmented audio signal.

A high frequency audio signal augmentation system of the type schematically illustrated in FIG. 7 can be utilized.

Let x(k) be the original input signal and y(l), the Extrapolated Signal to be created.

The oversampling ratio can be S (typically, S=2 or S=4). This is implemented using a sample rate converter (an oversampler) 54, into which the original audio signal is inputted.

Let the original FFT length be N; hence, the extended FFT length, N'=N.S

Let the two extrapolation FFT bins into which the representative high frequency samples are loaded (say 16.5 and 18 kHz) be defined as $e_1$ and $e_2$ Let the Overlap be L Process the input signal blocks in overlapping blocks as follows, using the segmenting function 56. Each of the overlapping blocks are successively multiplied with a Gaussian window function 43 using multiplier 58. The forward shift in the window function essentially defines the blocks and their degree of overlap.

In iteration p:

Take the windowed input block of length N $b_p(i)=x(L.p+I).w(i)$ for $i=0 \ldots N-1$ Take the (real) FFT of this input block $B_p=FFT\{b_p\}$ using FFT processor 44 (note, $b_p$ is of length N, but $B_p$ is of length N/2+1, because we are using the real FFT)

Define the Extrapolation factor f that tells us how the frequency response of $B_p$ can be extrapolated beyond the FFT bins $e_1$ and $e_2$, by a geometric progression. The Extrapolation factor f is a complex number, constrained to lie on or within the unit circle:

$f=B_p(e_2)/B_p(e_1)$ if $|i\ B_p(e_2)|<|B_p(e_1)|$ $f=0$ if $B_p(e_1)=0$ $f=(B_p(e_2)/B_p(e_1))/|B_p(e_2)/B_p(e_1)|$ otherwise This is achieved using a frequency extrapolation processor 50.

Form the new, extended frequency response $B'_p$ (which is of length N'/2+1) defined as:

$B'_p(i)=B_p(i)\ (0 \leq i \leq e_1)$ $B'_p(i)=B_p(e_1).f^{i-e1}\ (e_1<i \leq N'/2+1)$ Transform this extended frequency response back to the time domain using Inverse FFT processor 60, creating a time-domain signal block of length N':

$b'_p=IFFT\{B'_p\}$

This block of output is then summed into an output buffer after applying a suitable window w' which can be in the form of the Gaussian window 51. The summer and buffer are shown at 62. Many other different window functions can be used with this method, with one desirable window including a Hanning window.

$y_p(S.L.p+i)=y_{p-1}(S.L.p+i)+b'_p(i).w'(i)$ for $i=0 \ldots N'-1$

Following this summation operation, the first S.L samples are available to be output:

$y(S.L.p+i)=yp(S.L.p+i)$ for $i=0 \ldots S.L-1$

Part of the oversampled input audio signal is low pass filtered using the low pass filter 37 having a cut-off frequency of 19 kHz, towards the end of the audible frequency range. The summed extrapolated time domain samples are high pass filtered using the high pass filter 38, which has a cut-off frequency of 19 kHz, matching that the low pass filter 37 so as to prevent overlap of the low (audible) and high (ultrasonic) frequency parts of the signal, thereby to prevent lower frequency components of the ultrasonic signal interfering with the higher frequency components of the audible signal. These are then summed at summer 39 to yield an extrapolated or augmented output audio signal.

Figure 8:
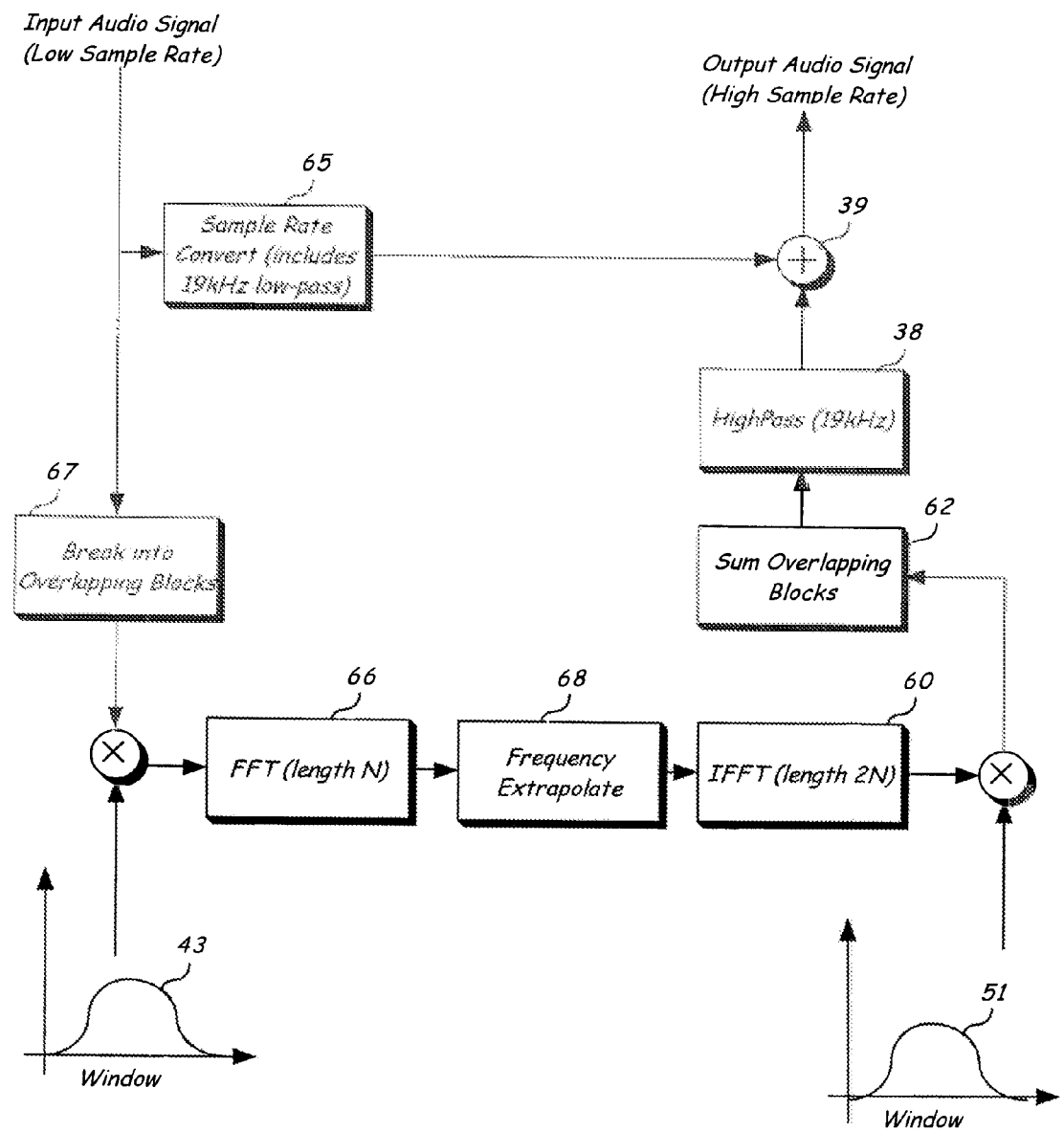
FIG. 8 illustrates a second embodiment of an apparatus for generating an augmented audio signal.

Referring now to FIG. 8, a further embodiment of a signal augmenting apparatus is shown which is specific to a doubling of the sampling rate. One part of the audio signal is processed through a sample rate converter or oversampler 65 which includes a 19 kHz low pass filter, with the low frequency output portion being fed to the summer 39. The other part of the input audio signal is fed to a segmenter 67 where it is broken into overlapping blocks. Each block is half as long as the equivalent blocks in FIG. 7 for the reason that the audio data has not been sample-rate converted or oversampled. Each block is in turn multiplied with the Gaussian window 43 and the result is converted into the frequency domain using a fast Fourier transform function 66 of length N, half that of the function 44 in FIG. 7. The frequency response is then processed using frequency extrapolator or interpolator 68, resulting in an extended audio signal of the type illustrated at 49 in FIG. 6. The augmented signal is inverse fast Fourier transformed back into the time domain using an inverse fast Fourier transform function 60. The resultant time domain signal has a length 2N. From then on, the processor is identical to that illustrated in FIG. 7.

It will be appreciated that in both FIGS. 7 and 8 each successive block defined by a shift in the window undergoes the process illustrated in FIG. 6 to yield a succession of partially computed output audio signals 52 which are then buffered and summed before being high pass filtered at 38. The main difference is that in FIG. 8 the frequency extrapolator 68 both doubles the length of the shorter frequency vector at the same time as extrapolating it.

In certain forms of the invention, the high and low pass filters may be eliminated. By way of example, with reference to FIG. 7 one embodiment may exclude low pass filter 37, high pass filter 38 and summer 39, with the extrapolation technique being sufficient to avoid corruption of the audible frequencies.

In a further possible embodiment, blocks 34, 37, 38 and 39 may be included, and the remaining blocks may be replaced by a crude interpolation function. In this embodiment, the high and low pass filters serve the primary function of preventing the high frequency portion of the signal from corrupting the low frequency portion.

The invention has numerous audio recordal and playback applications, including the following:
  remastering of digital and analogue recordings having a relatively low sampled rate in the region of 44 kHz;
  processing of recorded audio signals in CD, DVD and similar players having oversampling functions, where the audio content is coloured with but not altered by ultrasonic components;
  particular application in audio playback devices such as CD and DVD players, and in any similar devices where oversampling is utilized.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

The invention claimed is:

1. A method of adding high frequency content to an input signal to form an augmented signal, the method comprising the steps of:
  (a) providing an input signal having a first predetermined lower spectral range;
  (b) utilizing said input signal to form synthesized high frequency components of said input signal which extend beyond said lower spectral range;
  (c) filtering said input signal with a low pass filter and filtering said synthesized high frequency components with a high pass filter;
  (d) combining said high and low pass filtered signals to form said augmented signal.

2. A method as claimed in claim 1 wherein said step (b) further comprises:
  (i) for at least one portion of the input signal, determining the spectral content of said portion;
  (ii) extrapolating a high frequency end portion of the spectral content to form said synthesized higher frequency components of said signal.

3. A method as claimed in claim 2 wherein said portion is multiplied with a window function prior to determination of the spectral content, wherein said window function is a sliding window function such that there are a plurality of overlapping windowed portions for which the spectral content is determined and on which extrapolation occurs, and wherein said synthesized higher frequency components are summed in an overlap-add fashion.

4. A method as claimed in claim 3 which includes the step of dividing the input signal into a plurality of overlapping blocks, with each block being multiplied by a sliding window function to yield a series of windowed portions from which high frequency components are successively synthesized.

5. A method as claimed in claim 3 wherein said window is of a Gaussian or Hanning form.

6. A method as claimed in claim 2 wherein at least some of the highest frequency components of said spectral content are discarded prior to the extrapolation of the remaining high frequency components.

7. A method as claimed in claim 2 wherein said input signal is an audio signal, said lower spectral range corresponds to an audible component of said signal and said high frequency components correspond to ultrasonic components.

8. A method of adding high frequency content to an input signal to form an augmented signal, the method comprising the steps of:
  (a) providing an input signal having a first predetermined lower spectral range;
  (b) utilizing said input signal to form synthesized high frequency components of said initial signal which extend beyond said lower spectral range, wherein step (b) further comprises:
    (i) for at least one portion of the input signal, determining the spectral range of said portion;
    (ii) extrapolating a high frequency end portion of the spectral range to form said synthesized higher frequency components of said signal.

9. A method according to claim 8 wherein said portion is multiplied with a window function prior to determination of the spectral content, wherein said window function is a sliding window function such that there are a plurality of overlapping windowed portions for which the spectral content is determined and on which extrapolation occurs, and wherein said synthesized high frequency components are summed in an overlap-add fashion.

10. A method according to claim 9 which includes the steps of dividing the input signal into a plurality of overlapping blocks, with each block being multiplied by a sliding window function to yield a series of windowed portions from which high frequency components are successively synthesized.

11. A method as claimed in claim 8 wherein at least some of the highest frequency components of said spectral content are discarded prior to the extrapolation of the remaining high frequency components.

12. A method as claimed in claim 8 in which the step of extrapolating said high frequency end portion comprises the steps of sampling the high frequency components, defining an extrapolation factor based on a geometric progression, and generating said geometric progression on the basis of the sampled high frequency components.

13. A method as claimed in claim 8 wherein said input signal is an audio signal, said lower spectral range corresponds to an audible component of said signal and said high frequency components correspond to ultrasonic components.

14. Apparatus for adding high frequency content to an input signal to form an augmented signal, the apparatus comprising:
- (a) a synthesizing processor for synthesizing high frequency components from an input signal having a first predetermined lower spectral range, said high frequency components extending beyond said lower spectral range;
- (b) a low pass filter for filtering said input signal;
- (c) a high pass filter for filtering said synthesized high frequency components;
- (d) a combiner for combining said high and low pass filtered signals to form said augmented signal.

15. An apparatus according to claim 14 in which said synthesizing processor comprises means for determining the spectral content of at least one portion of said input signal and means for extrapolating from a high frequency end portion of said spectral content to form said synthesized high frequency components of said signal.

16. An apparatus for adding high frequency content to an input signal to form an augmented signal, the apparatus comprising:
- (a) a synthesizing processor for synthesizing high frequency components from an input signal having a first predetermined lower spectral range, said high frequency components extending beyond said lower spectral range;
- (b) means for dividing the input signal into a plurality of overlapping portions;
- (c) means for determining the spectral content of each of said overlapping portions;
- (d) means for extrapolating the high frequency end portion of the spectral content to form said synthesized high frequency components of said signal;
- (e) means for summing said synthesized high frequency components in a overlap-add fashion.

* * * * *